United States Patent [19]

Wilkinson

[11] 4,410,990
[45] Oct. 18, 1983

[54] PROCESSING BINARY DATA

[75] Inventor: James H. Wilkinson, Tadley, Near Basingstoke, England

[73] Assignee: Sony Corporation, Tokyo, Japan

[21] Appl. No.: 250,928

[22] Filed: Apr. 6, 1981

[30] Foreign Application Priority Data

Apr. 29, 1980 [GB] United Kingdom ................. 8014119

[51] Int. Cl.³ .................................... G06F 11/10
[52] U.S. Cl. ..................................... 371/47; 364/900
[58] Field of Search ... 364/200 MS File, 900 MS File; 178/22.07, 22.14; 371/37, 47

[56] References Cited

U.S. PATENT DOCUMENTS

| | | | |
|---|---|---|---|
| 3,251,034 | 5/1966 | Goode et al. | 371/47 |
| 3,648,237 | 3/1972 | Frey, Jr. et al. | 371/47 |
| 4,107,458 | 8/1978 | Constant | 364/900 |
| 4,172,213 | 10/1979 | Barnes et al. | 178/22.07 |

*Primary Examiner*—Felix D. Gruber
*Assistant Examiner*—D. H. Rutherford

*Attorney, Agent, or Firm*—Lewis H. Eslinger; Alvin Sinderbrand

[57] ABSTRACT

Frame information is recovered from a stream of binary data formed at a transmitter from a block of m × n information bits comprising m groups of n bits plus m parity bits, one for each said group of n bits, these parity bits having then been scrambled by performing an exclusive-OR operation in a gate on each parity bit with a respective bit of an m-bit parity scrambling code, said block of bits together with the scrambled parity bits forming a frame for transmission over a transmission link. At a receiver new parity bits are produced in a parity bit generator at the incoming bit rate from the incoming stream of binary data by forming a new parity bit from each successive moving group of n+1 incoming bits. The new parity bits are cyclically distributed to n+1 m-bit shift registers and a framing signal is produced when one of the shift registers holds m bits substantially corresponding to the m bits of the parity scrambling code.

22 Claims, 3 Drawing Figures

4,410,990

PROCESSING BINARY DATA

BACKGROUND OF THE INVENTION

1. Field of the Invention

This invention relates to methods of and apparatus for processing binary data.

More particularly, the invention is concerned with the recovery of socalled framing information from an incoming stream of binary data.

2. Description of the Prior Art

Consider, for example, a color television camera control system in which control and information signals are coded to produce blocks of bits which are put together to form a continuous stream of binary data which is then supplied over a transmission link such as an audio pair or radio link to a remote television camera. At the camera the incoming stream of binary data must be decoded to derive the control and information signals. The steps necessary to do this include recovery of the clock signal, and then framing, this latter term meaning identification of which bits in the stream of binary data form the required blocks of bits representing the control and information signals. Recovery of the clock signal is generally quite simple and may use a phase lock technique. This technique may fail if the data is all "0" or all "1", but this problem can be overcome fairly simply, for example, as will be described below.

A more difficult problem is the framing. In one proposed control system the data are produced in blocks of eight bits, each block having in addition a parity bit, so that the transmitted blocks are each of nine bits. At the receiver the incoming stream of binary data is tested successively in each of the nine possible framing positions to see which position most accurately regenerates the received parity bits. However, it is possible in some circumstances for the lock-in to occur incorrectly, and this possibility becomes more likely in the quite common situation where the incoming stream of binary data contains errors after transmission over a noisy link.

OBJECTS AND SUMMARY OF THE INVENTION

One object of the present invention is to provide an improved method and apparatus for recovering framing information from an incoming stream of binary data.

Another object of the present invention is to provide a method and apparatus for forming parity bits corresponding to binary data and then scrambling said parity bits using a scrambling code.

Another object of the present invention is to provide a method and apparatus for recovering framing information from an incoming stream of binary data by reforming a scrambled parity code and matching it with a scrambling code used at the transmitter.

According to the present invention there is provided a method of recovering frame information from a stream of binary data, the method comprising:

deriving a block of m×n information bits comprising m groups of n bits; forming m parity bits, one for each said group of n bits;

scrambling said parity bits by performing a logic operation on each said parity bit with a respective bit of an m-bit parity scrambling code, said block of bits together with said scrambled parity bits forming a frame for transmission over a transmission link;

at the remote end of said transmission link forming new parity bits at the incoming bit rate from the incoming stream of binary data by forming a new parity bit from each successive moving group of n+1 incoming bits;

distributing said new parity bits cyclically to n+1 bit storage means each capable of storing m bits; and generating a framing signal when one of said bit storage means holds m bits substantially corresponding to the m bits of said parity scrambling code.

According to the present invention there is also provided apparatus for recovering frame information from a stream of binary data, the apparatus comprising:

means for deriving a block of m×n information bits comprising m groups of n bits;

first parity bit forming means for forming m parity bits, one for each said group of n bits;

means for scrambling said parity bits by performing a logic operation on each said parity bit with a respective bit of an m-bit parity scrambling code, said block of bits together with said scrambled parity bits forming a frame for transmission over a transmission link;

second parity bit forming means at the remote end of said transmission link for forming new parity bits at the incoming bit rate from the incoming stream of binary data by forming a new parity bit from each successive moving group of n+1 incoming bits;

n+1 m-bit shift registers to which said new parity bits are cyclically distributed; and means for generating a framing signal when one of said shift registers holds m bits substantially corresponding to the m bits of said parity scrambling code.

The above and other objects, features, and advantages of this invention will be apparent from the following detailed description of an illustrative embodiment which is to be read in connection with the accompanying drawings.

BRIEF DESCRIPTION OF THE DRAWINGS

FIG. 3 is a graph illustrating the autocorrelation of the parity scrambling code.

DESCRIPTION OF THE PREFERRED EMBODIMENTS

The invention will be described in relation to data transmission in a color television camera control system, but it should be emphasised that this is merely an example, and that the invention can be applied to binary data transmission in a wide range of other systems.

The part of the camera control system of relevance here is the part that enables control and information signals to be produced in the form of a continuous stream of binary data which can then be supplied over a transmission link, such as an audio pair or a radio link, between a central control point and a remote color television camera. The stream of binary data comprises successive blocks of forty-five bits made up as follows: four bits are allocated to an analog address, and eight bits to analog data. The analog data relates to a range of camera functions, and controls and information concerning each of these is normally transmitted cyclically; hence the need for an analog address to indicate which function the analog data relates to. Eight bits relate to the camera iris control, this being the most commonly used manual control. Two bits relate to the camera identification code, one bit defines the state of the tally light, two bits relate to an address for the following ten bits which relate to switch data, and ten bits relate to color sub-carrier control data.

The forth-five bits are produced and assembled in the transmitter and then divided into fifteen groups of three bits, to each group of which is added a parity bit. In this particular example even parity is used, but odd parity could also be used.

Figure 1:
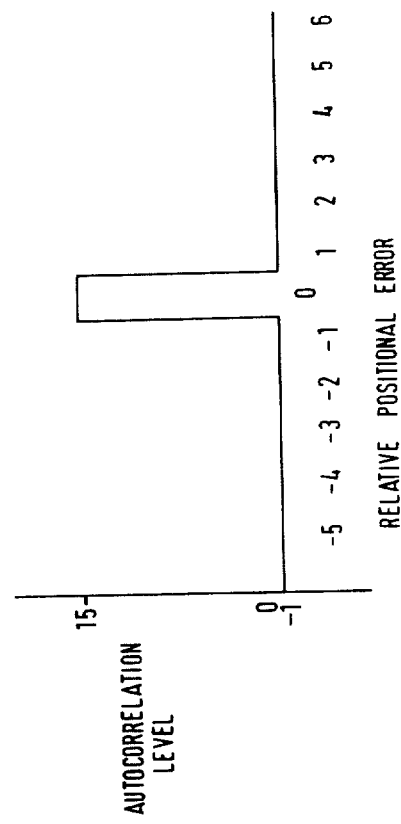
FIG. 1 shows an example of binary data with parity bits and a parity scrambling code at various stages of processing.

FIG. 1(A) shows an example of a block of forty-five bits divided into fifteen groups of three bits, and FIG. 1(B) shows the same data with the fifteen even parity bits added. The resulting block of sixty bits will hereinafter be referred to as a frame. A continuous sequence of frames is to be transmitted by the transmitter at a frequency which is a multiple of six-hundred bits per second over the transmission link, which may well be noisy or subject to fading. At the receiver, the incoming stream of binary data must be decoded to derive the transmitted signals. The steps necessary to do this include recovery of the clock signal, framing, and where possible detection of bit errors which have occurred in transmission.

Recovery of the clock signal makes use of a phase lock technique of known form which will not be described further, except to mention that this technique may fail if the basic data is all "0" or all "1".

A more difficult problem is framing which needs to be done not only with certainty, but also as quickly as possible. That is to say, initial lock-in must be achieved in as few frames as possible, and when lock-in has been lost for any reason it must be regained in as few frames as possible. To achieve this, the fifteen parity bits initially produced in the transmitter are scrambled prior to transmission by performing an exclusive-OR operation on each of the fifteen parity bits with respective bits of a 15-bit parity scrambling code as shown in FIG. 1(C). The particular parity bit scrambling code used, that is, 010100001110110, is selected because it has a very high degree of randomness as indicated by the quality of the autocorrelation function (referred to in more detail below with reference to FIG. 3). By randomness it is meant that although the scrambling code has approximately equal numbers of "1" and "0" bits, the bits are arranged in an irregular fashion. Hence, this scrambling code offers a very high probability of recognition in the receiver in the presence of errors in transmission, irrespective of the bit content of the data being transmitted. FIG. 1(D) shows a frame after the exclusive-OR operation applied to the parity bits. The signal transmitted is a continuous sequence of such frames.

Some form of scrambling may also be applied to the information bits, but this is not relevant to the invention and will not therefore be described herein.

Figure 2:
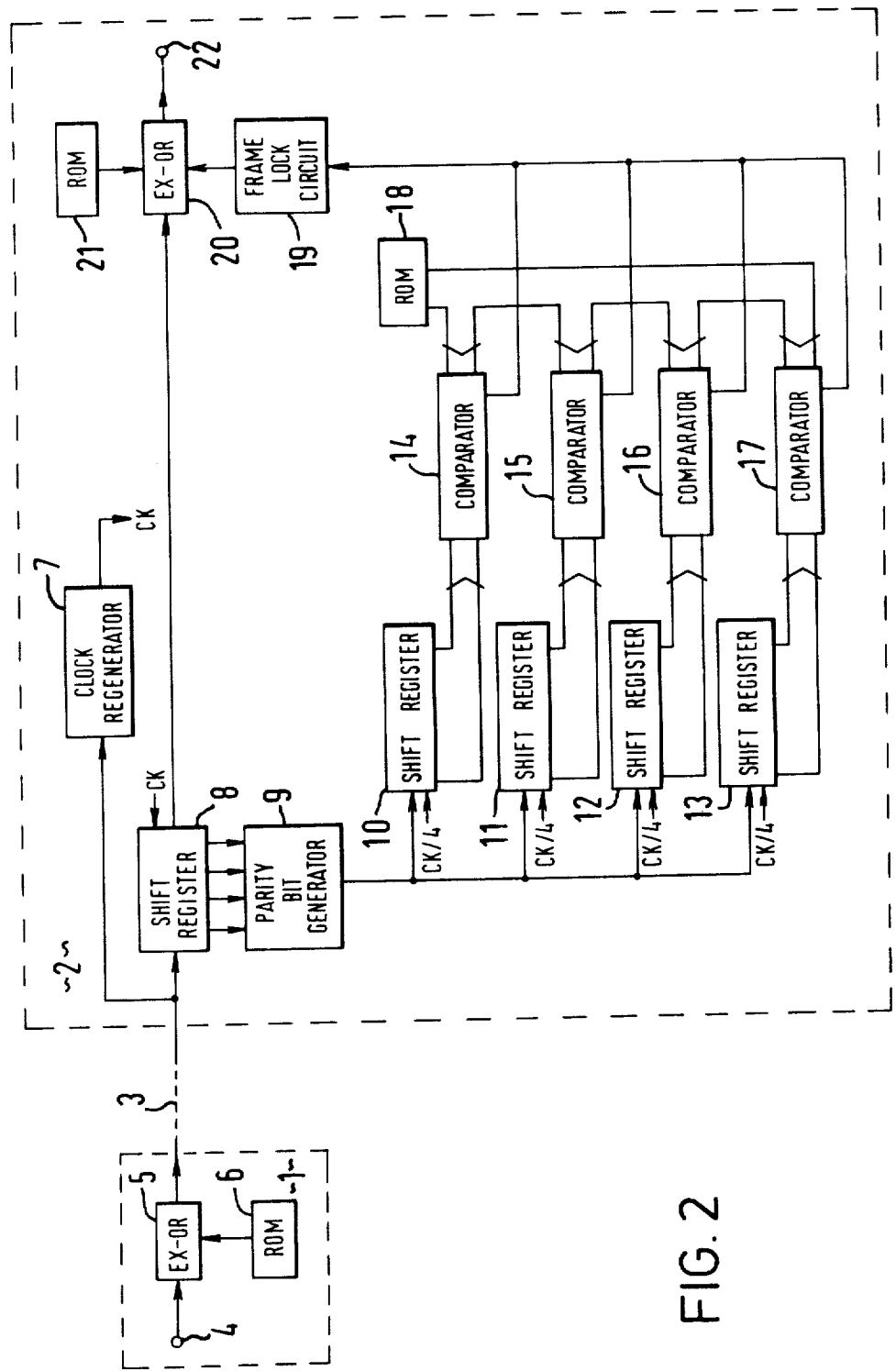
FIG. 2 is a block diagram of a transmitter/receiver system incorporating an embodiment of the invention.

Reference will now be made through FIG. 2, which shows a transmitter/receiver system comprising a transmitter 1 and a receiver 2 between which the data is passed over a noisy link 3. The transmitter 1 includes a terminal 4 to which the serial stream of binary data including the even parity bits (FIG. 1(B)), is supplied to an exclusive-OR gate 5. Also supplied to the exclusive-OR gate 5 is the parity scrambling code which may be derived from a read only memory (ROM) 6. The transmitter 1 also of course includes timing means (not shown) to ensure that the respective bits of the parity scrambling code are supplied to the exclusive-OR gate 6 in synchronism with the respective even parity bits. The output of the exclusive-OR gate 5 forms the stream of binary data which is transmitted over the link 3 to the receiver 2.

At the receiver 2 the clock signal is first recovered by a clock regenerator 7 to provide a clock signal CK for the receiver 2. It will be noted that the form of the parity scrambling code is such as to assist clock recovery, by providing a reasonable number of signal transients, even in the case where the basic data is all "0" or all "1". The incoming stream of binary data is supplied to a 4-bit shift register 8 which is clocked by the clock signal CK. At each clock pulse the four incoming bits then resident in the shift register 8 are used by a parity bit generator 9 to produce an even parity bit which is supplied to respective inputs of four 15-bit shift registers 10, 11, 12 and 13 which are respectively stepped by divided clock signals derived by dividing the clock signal CK by four, the respective divided clock signals differing in phase from one another by one bit period. It will thus be seen that the parity bit generator 9 produces parity bits from moving groups of four bits in synchronism with the bit rate of the incoming stream of binary data and that these parity bits are supplied cyclically into the shift registers 10, 11, 12 and 13 and stepped therethrough at one-quarter of the incoming bit rate.

FIG. 1(E) shows the fifteen parity bits that the parity bit generator 9 will produce when the shift register 8 successively holds the three bits corresponding to each of the original fifteen groups of three bits and the scrambled parity bit associated with that group. It will be seen that this group of fifteen parity bits is identical with the parity scrambling code. Assuming, therefore, that there have been no errors in transmission, then it will be seen that at the instant when the first complete frame of sixty bits has been received by the receiver 2, one of the shift registers 10, 11, 12 or 13 will be holding fifteen parity bits identical to the parity scrambling code.

As the incoming stream of binary data continues to be received, the situation will change, but again assuming that there are no errors in transmission the parity scrambling code will re-appear in one of the shift registers 10, 11, 12 or 13 once every frame. At other times, the groups of fifteen bits held in the shift registers 10, 11, 12 and 13 are most unlikely to correspond exactly or even approximately to the parity scrambling code, this fact resulting from the randomness of the parity scrambling code.

FIG. 3 represents the autocorrelation of the parity scrambling code in the form of a graph in which the ordinates are the autocorrelation level and the abscissae are the relative possitional error. It will be seen that the graph shows a very distinct peak when the framing is correct, this being a consequence of the randomness of the parity scrambling code. It will also be apparent that even if some errors have occurred in transmission with the result that the group of fifteen parity bits which is held in one of the shift registers 10, 11, 12 or 13 and which best approximates to the parity scrambling code nevertheless differs from the parity scrambling code by up to several bits, then this is still much more likely to result in correct framing than in incorrect framing.

To identify the framing, therefore, the fifteen bits held in each of the shift registers 10, 11, 12 and 13 are continuously supplied in parallel to respective 15-bit comparators 14, 15, 16 and 17 to which the parity scrambling code is also supplied in parallel from a read only memory 18. On identifying a perfect or near-perfect match between the fifteen bits held in one of the shift registers 10, 11, 12 or 13 and the parity scrambling code, the relevant comparator 14, 15, 16 or 17 supplies a signal to a frame lock circuit 18 to indicate that the incoming bit received by the receiver 2 is the last bit of a frame.

From the shift register 8 the incoming data stream is supplied to an exclusive-OR gate 20, to which is also supplied the parity scrambling code from a read only memory 21. The output of the read only memory 21 is under control of a signal supplied by the frame lock circuit 19 so that when the frame lock has been established in the receiver 2, the bits of the parity scrambling code are supplied to the exclusive-OR gate 20 in synchronism with the respective scrambled parity bits of the incoming stream of data. The output of the exclusive-OR gate 20, which is supplied to a terminal 22 then consists of the original data with the original even parity bits as shown in FIG. 1(F). If desired, the data can then be subjected to error detection techniques making use of the parity bits, prior to being decoded.

Although a particular example of the random parity scrambling code has been given, it will be appreciated that other random codes can be used, and obviously other codes will be necessary where the number of groups of bits in the basic data is other than fifteen. The method is of course also applicable to cases where the number of bits in each group is some number other than three. Moreover, although it has been assumed that the parity bit following each group of three bits belongs to that particular group, this is not in fact essential. There may be circumstances where it is preferable for the parity bit transmitted with a particular group of bits to come from some other area of the basic data. Finally, although the parity bits have been described as being combined with the parity scrambling code using an exclusive-OR operation, some other logic operation such as multiplying may be used.

Although illustrative embodiments of the invention have been described detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of recovering frame information from a stream of binary data transmitted at a known clock rate, the method comprising:
    deriving a block of m×n information bits comprising m groups of n bits;
    forming m parity bits, one for each said group of n bits;
    forming an m-bit parity scrambling code;
    forming scrambled parity bits by performing a logic operation on each said parity bit with a respective bit of said m-bit parity scrambling code;
    forming a frame for transmission over a transmission link from said block of information bits and said scrambled parity bits;
    at the remote end of said transmission link forming new parity bits at the known clock rate from the transmitted stream of binary data by forming a new parity bit from each successive moving group of n+1 bits;
    distributing said new parity bits cyclically at a selected fraction of said known clock rate to n+1 bit storage means each capable of storing m bits; and
    generating a framing signal when one of said n+1 bit storage means holds m bits substantially corresponding to said m-bit parity scrambling code.

2. A method according to claim 1 wherein said step of forming an m-bit parity scrambling code includes forming a predetermined random sequence of m bits.

3. A method according to claim 1 wherein said step of performing a logic operation includes performing an exclusive-OR operation.

4. A method according to claim 1 wherein said step of forming a parity bit includes forming an even parity bit and said step of forming a new parity bit includes forming an even parity bit.

5. A method according to claim 2 including choosing m as fifteen.

6. A method according to claim 5 wherein said step of forming an m-bit parity scrambling code includes choosing the bits as 010100001110110.

7. A method according to claim 1 wherein the step of deriving a block of m×n information bits includes choosing n as three.

8. Apparatus for recovering frame information from a stream of binary data transmitted at a known clock rate, the apparatus comprising:
    means for deriving a block of m×n information bits comprising m groups of n bits;
    first parity bit forming means for forming m parity bits, one for each said groups of n bits;
    means for forming an m-bit parity scrambling code;
    means for scrambling said parity bits formed by said first parity bit means by performing a logic operation on each m parity bit with a respective bit of said m-bit parity scrambling code, said block of information bits together with the scrambled parity bits forming a frame for transmission over a transmission link;
    second parity bit forming means at the remote end of said transmission link for forming new parity bits at the known clock rate from the transmitted stream of binary data by forming a new parity bit from each successive moving group of n+1 bits;
    n+1 m-bit shift registers to which said new parity bits are cyclically distributed at a preselected fraction of said known clock rate; and
    means for generating a framing signal when one of said n+1 m-bit shift registers holds m bits substantially corresponding to said m-bit parity scrambling code.

9. Apparatus according to claim 8 wherein said parity scrambling code is a predetermined random sequence of m bits.

10. Apparatus according to claim 8 wherein said means for scrambling includes an exclusive-OR gate for performing said logic operation.

11. Apparatus according to claim 8 wherein said first parity bit forming means includes means for forming an even parity bit and said second parity bit forming means includes means for forming an even parity bit.

12. Apparatus according to claim 9 wherein m is fifteen.

13. Apparatus according to claim 12 wherein said parity scrambling code is 010100001110110.

14. Apparatus according to claim 8 wherein n is three.

15. A method for recovering frame information according to claim 1 including selecting said fraction of said known clock rate to be said known clock rate divided by n+1.

16. A method for recovering frame information according to claim 1 wherein the step of distributing said new parity bits includes clocking said new parity bits into said bit storage means using number of clock signals that differ in phase one from another by one bit period.

17. A method for recovering frame information according to claim 1 wherein said step of generating a framing signal includes comparing the bits in said bit storage means to said parity scrambling code, producing a frame lock signal upon a successful comparison, and performing a logical operation on each of said scrambled parity bits with a respective one of said m-bit parity scrambling code for producing an output therefrom.

18. Apparatus for recovering frame information according to claim 8 further comprising means for cyclically distributing said new parity bits at said known clock rate divided by n+1.

19. Apparatus for recovering frame information according to claim 8 further comprising means for cyclically distributing said new parity bits into said n+1 m-bit shift registers by generating a number of clock signals that differ in phase one from another by one bit period.

20. Apparatus for recovering frame information according to claim 8 wherein said means for generating a framing signal includes comparator means for performing a bit-by-bit comparison between said new parity bits and said m-bit parity scrambling code.

21. Apparatus for recovering frame information according to claim 20 wherein said means for generating a framing signal further includes a memory means containing said m-bit parity scrambling code for feeding to said comparator means for comparison with said new parity bits.

22. Apparatus for recovering frame information according to claim 21 wherein said means for generating a framing signal further includes frame lock circuit means connected to receive a signal from said comparator means for producing a signal indicating correct recovery of frame information.

* * * * *